Dec. 4, 1934.                C. H. DAVIS, JR                    1,983,072
                              IGNITION APPARATUS
                      Filed July 14, 1932           3 Sheets-Sheet 1

Inventor
Charles H. Davis, Jr., deceased
by John T. Fitzsimmons, Administrator
By Spencer Hardman & Fehr
Attorneys Dec. 4, 1934. C. H. DAVIS, JR 1,983,072
IGNITION APPARATUS
Filed July 14, 1932 3 Sheets-Sheet 2

Inventor
Charles H. Davis, Jr., deceased
by John T. Fitzsimmons, Administrator
By
Spencer Hardman & Fehr
Attorneys Inventor
Charles H. Davis, Jr., deceased
by John T. Fitzsimmons, Administrator
By Spencer Hardman & Fisher
Attorneys Patented Dec. 4, 1934

1,983,072

UNITED STATES PATENT OFFICE 1,983,072

IGNITION APPARATUS

Charles H. Davis, Jr., deceased, late of Anderson, Ind., by John T. Fitzsimmons, administrator, Anderson, Ind., assignor, by mesne assignments, to General Motors Corporation, Detroit, Mich., a corporation of Delaware Application July 14, 1932, Serial No. 622,471

16 Claims. (Cl. 64—90.5)

This invention relates to ignition apparatus for internal combustion engines, and more particularly to ignition apparatus having an engine speed responsive device which controls the angular relation between the ignition timer cam and the engine part which drives it, whereby to vary the timing of the ignition impulse relative to the cycle of engine operation.

An object of the present invention is to provide an ignition apparatus with a universal speed responsive device which is efficient and reliable in operation. This is accomplished by providing a speed responsive device with a set of parts, such as weights, lever arms, studs, and supporting plate that are interchangeable and reversible so that by a slight rearrangement it may be made to operate in either direction of rotation of its driving shaft. Furthermore the speed responsive device provides a structure that will produce the proper spark advance for a wide range of engine speed and power conditions. In this manner the number of different parts required for producing a speed responsive device for an entire line of ignition apparatus to suit different engine requirements will be reduced to a minimum.

Further objects and advantages of the present invention will be apparent from the following description, reference being had to the accompanying drawings wherein a preferred embodiment of one form of the present invention is clearly shown.

Figure 14:
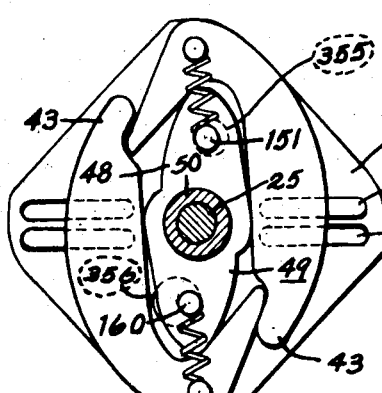
Fig. 14 is a plan view of another modified form of a speed responsive device illustrating an assembly of rotating parts adapted for clockwise rotation.
Figure 15:
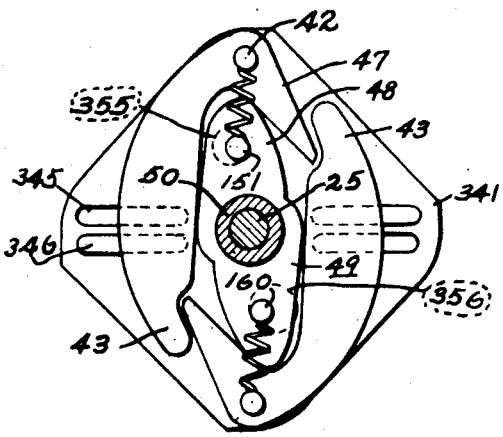
Fig. 15 is a plan view of an assembly of parts used in the assembly shown in Fig. 14 and showing the parts adapted for counterclockwise direction.
Figure 16:
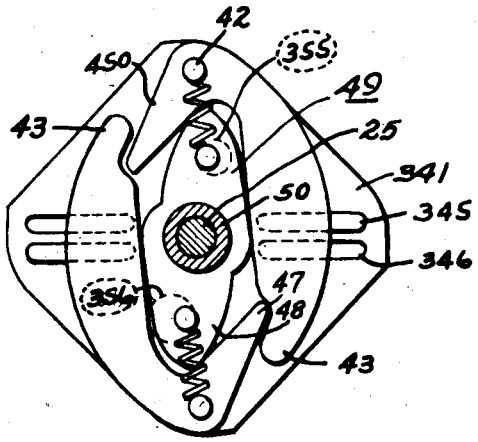
Figure 17:
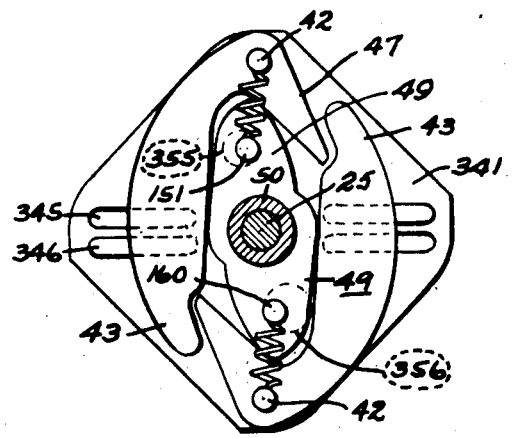

Figs. 16 and 17 respectively are plan views similar to Figs. 14 and 15 respectively to permit a greater advance of the rotating part for a clockwise and counterclockwise rotation, respectively.

Figure 18:
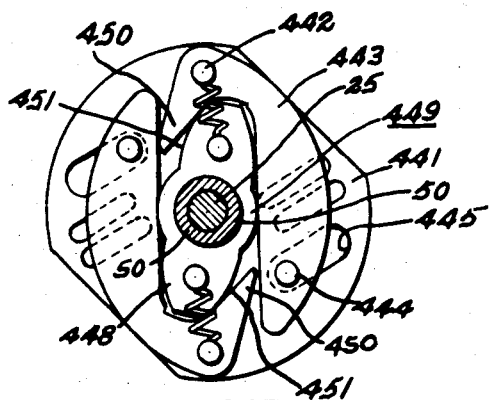

Fig. 18 is a plan view of another modified form of a speed responsive device showing an assembly of parts adapted to be rotated in a clockwise direction.

Figure 19:
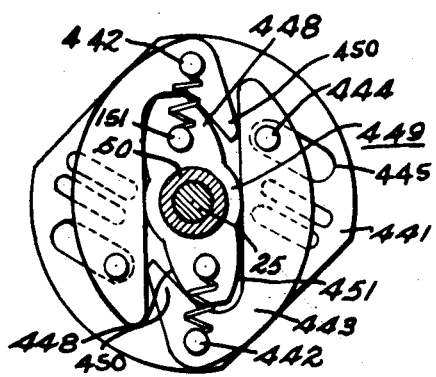

Fig. 19 is a plan view showing the parts illustrated in Fig. 18 adapted for a counterclockwise rotation.

Referring to the drawings, 20 designates an ignition distributor comprising a timer cup 21 having a shank 22 to provide a bearing surface 23 for an ignition timer drive shaft 24. The shaft has an extension 25 of smaller diameter providing a journal for a timer cam 26 mounted thereon and free to rotate relative thereto. The cam 26 is drivingly connected with, and supports a rotor 27 carrying a segment 28. One end of the segment 28 cooperates with a central, stationary distributor contact 29, and the other end of the segment cooperates with distributor inserts 30 arranged in a circular row. The contact 29 and inserts 30 are connected electrically with needles 31, the needle 31 engaging the strands of high tension cable leading from any suitable coil provided in the ignition circuit (not shown). This high tension cable is received by a central socket 31a of a distributor head 33. A series of sockets 32 are provided on the distributor head 33 in equally spaced relation and arranged in a circular row about the central socket 31a, these sockets 32 are adapted to receive wires (not shown) that are directed to the spark plugs of an engine upon which the distributor 20 is attached.

The cam 26 cooperates with a rubbing block 34 of a circuit breaker arm 35 pivoted upon a stud 36. The stud is carried by a plate 37 but insulated from the arm 35 by an insulating bushing 36a. The plate is mounted in any suitable manner within the cup 21. A leaf spring 38 electrically connected to the breaker arm 35 urges the rubbing block 34 toward the cam 26. The spring 38 serves to conduct the current to the circuit breaker lever 35 and a movable contact 39 carried thereby. When the cam is out of engagement with the block 34 the contact 39 is urged by the spring 38 into engagement with a stationary timer contact 40.

Figure 6:
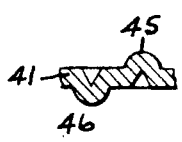
Fig. 6 is a sectional view on the line 6—6 of Fig. 2.

The shaft 24 carries and drives a weight supporting plate or base 41 to which are attached studs 42, each stud serving as a pivot post for a weight 43. Each weight 43 is spaced from the base 41 by a washer 44 and a rib 45. The plate is also provided with ribs 46. These ribs 45 and 46 are struck up from their respective surfaces of the plate as shown in Fig. 6. The rib 45 tends to reduce friction which would retard the movement of the weights 43 about their pivots 42. Each weight 43 is provided with a finger or tail piece 47 which engages a camming surface of an arm 48 of a lever 49. It will be noted that the arms 48 are provided with two different contours 48a and 48b. These contours are each adapted to engage the fingers 47 of the weights 43 in different combinations. Thus two different types of curves may be had with the same advance cam and either type of curve may be used in either clockwise or counterclockwise rotation depending on the way the different elements comprising the speed responsive device are assembled together to suit the requirements of a particular engine. In either case the lever 49 with the arms 48 must be assembled on the same shaft portion 50 having regard for the direction of rotation of the drive shaft 24. When the lever 49 is suitably attached to a shank portion 50 of the cam 26 the assembly is journalled upon the extension 25. Each of the lever arms 48 carries a post 51 and each post 51 is connected to its adjacent post 42 by a spring 52, said posts 51 are long enough to extend through apertures 55 and 56 provided in the plate 41.

Figure 2:
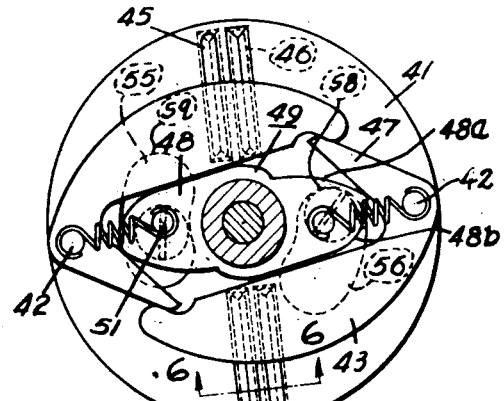
Fig. 2 is a plan view showing the speed responsive device for clockwise rotation.
Figure 3:
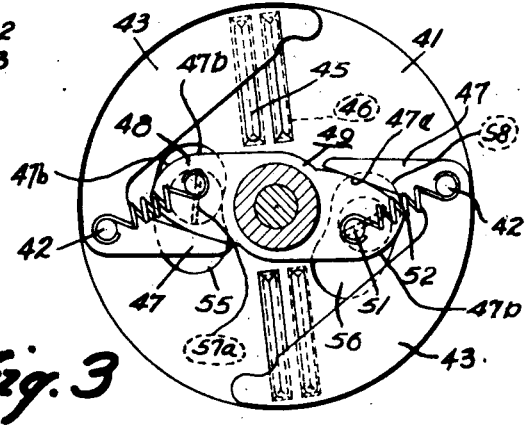
Figs. 3 and 4 are plan views showing the speed responsive device in part and full advance positions, respectively.
Figure 4:
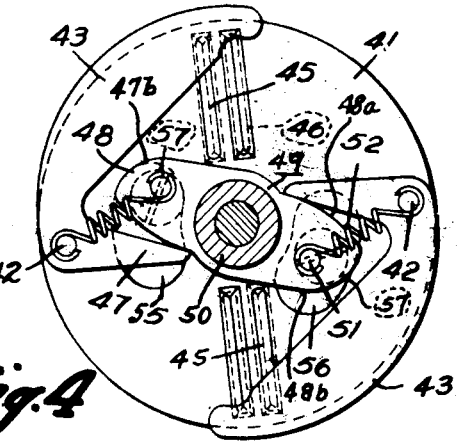

Formed on each extension of the posts 51 is an eccentric portion 57, the post and eccentric are mounted in a predetermined relation upon the lever arms to control the angular movement of the timer cam with respect to the shaft 24. Each eccentric is provided with a slot 57a to facilitate in locating the eccentrics in a correct position upon the lever arms 48 for a predetermined angular movement of the cam 26 relative to the shaft 24. It is to be understood that the studs 51 with the eccentric portion 57 cam be mounted in an infinite number of positions relative to the arm 48 to provide for an infinite number of angular movements of the cam 26 relative to the shaft 24. The holes 55 and 56 are of such size as to receive the eccentrics in all of their possible assembled positions so as to permit a free movement between the plate 41 and the eccentrics to allow the advancing of the cam 26 relative to the timer drive shaft 24. Thus when the device is in operation, centrifugal force acting upon the weights will overcome the resistances of the springs 52 to permit the weights to swing out about their pivots toward the periphery of the plate 41, thereby causing the fingers 47 to rock along the surface 48a of the arms 48 and cause the lever arms to be rotated in a clockwise direction as viewed in Fig. 3, to advance the cam of the ignition timer. The lower end of the studs with the eccentric formed thereon extends into the holes 55 and 56, one of the eccentrics will cooperate with an edge 58 of the apertures 56 in the plate 41, the edge 58 determines the retard position of the cam, while another eccentric will cooperate with an edge 59 of the aperture 55 in the plate that will determine the position of the cam at maximum advance and at the same time limit the outward movement of the weights 43, as shown in Fig. 4. The speed responsive device as viewed in Figs. 2, 3 and 4 is assembled for a timer for which the timer cam shaft is to revolve in a clockwise direction.

Figure 5:
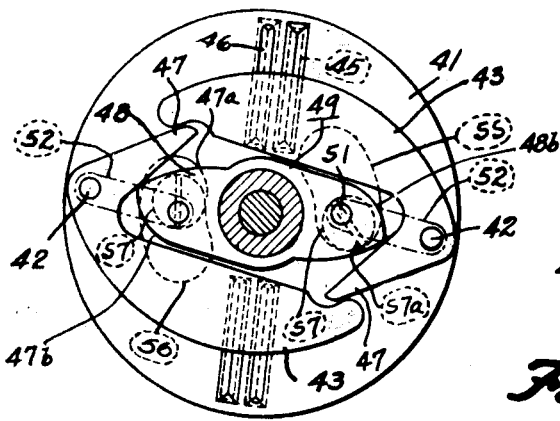
Fig. 5 is an assembly of parts adapted for counterclockwise rotation.

If it is desired to adapt the speed responsive mechanism for an installation in which the timer shaft is revolved in a counter-clockwise direction, the plate 41, weights 43, lever 49 and the posts 42 and 51 are reversed as shown in Fig. 5. In other words, the plate 41 and associated parts are assembled in proper relation with respect to each other and are turned bottom upward from the position shown in Fig. 2 to the position shown in Fig. 5. Therefore, in such a construction when the weights swing out the lever 49 will be rotated in a counterclockwise direction relative to the shaft 24 and will advance the cam 26 in a counterclockwise direction. In Fig. 5 the plate has been reversed from that shown in Fig. 2, the weights, 43, pivoted upon the stud will now rest upon the ribs 46, these ribs tend to reduce friction which would retard the movement of the weights about the pivot 42 when the weights fly outward in a clockwise rotation as the cam 26 is rotated in a counterclockwise rotation.

Figs. 7 to 10 inclusive, show a modified form of the present invention for which a supporting plate or base 141 is provided with a plurality of spaced apertures 155 and 156 of different dimensions, each aperture determining the amount of advance of the timer cam for a particular type engine. It will be noted that the spaced apertures in the plate are not diametrically opposite. The plate 141 is provided with ribs 145 and 146 struck up from their respective surfaces. These ribs tend to reduce friction of the weights 43. This construction of the plate 141 performs in a similar manner as that described of the plate 41.

Figure 7:
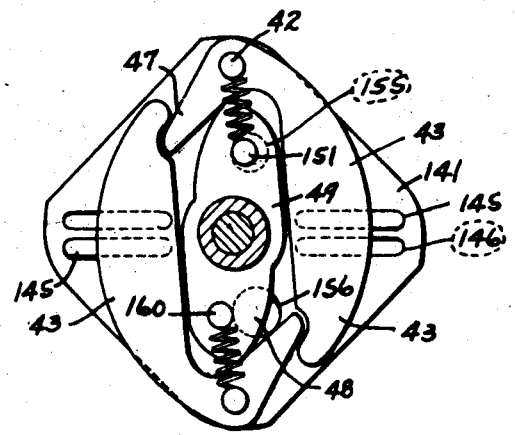
Fig. 7 is a plan view of a modified form of a speed responsive device showing an assembly of the rotating parts adapted for clockwise rotation.
Figure 8:
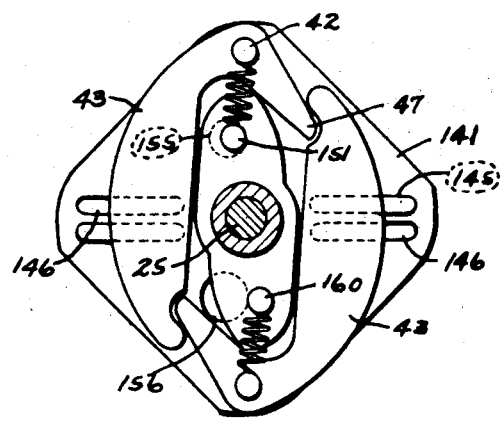
Fig. 8 is a plan view of an assembly of the rotating parts for counterclockwise rotation.

In the device shown in Fig. 7, a post 151 is long enough to extend into the aperture 155 in the plate 141, while another post 160 is free from the plate. This device operates in a similar manner as that shown in Fig. 2, thus centrifugal force will cause the weights 43 to swing out toward the periphery of the plate 141 and will cause the lever 49 to be rotated in a clockwise direction to advance the ignition timer as the speed increases. The lower end of the post 151 extending into the aperture 155 cooperates with plate 141 to provide a stop limiting the movement of the weights 43. When the post 151 is within the aperture 155 shown in Fig. 7, the cam can be advanced substantially 15° in a clockwise rotation. If it is desired to adapt the apparatus for an installation in which the lever 49 is revolved in a counter-clockwise direction to advance the cam 15° in a counter-clockwise direction, the plate 141, the lever 49, and the weights 43 are reverse upon a horizontal line of Fig. 7 and assembled as shown in Fig. 8. In such a construction the weights will swing out in clockwise direction and advance the arms 48 which in turn advance the cam 26 in a counter-clockwise direction. It is also necessary to assemble the posts 151 and 160 upon the proper face of the arms 48.

Figure 9:
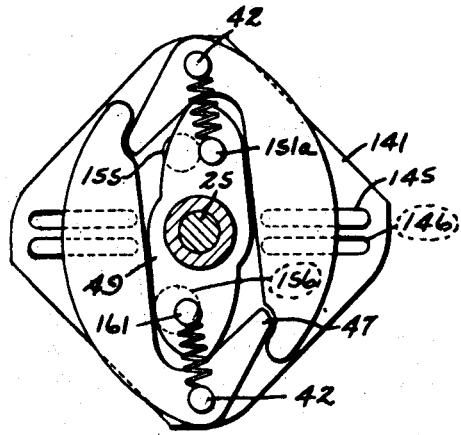
Fig. 9 is a plan view similar to Fig. 7 to permit a greater advance of the rotating parts for a clockwise rotation.
Figure 10:
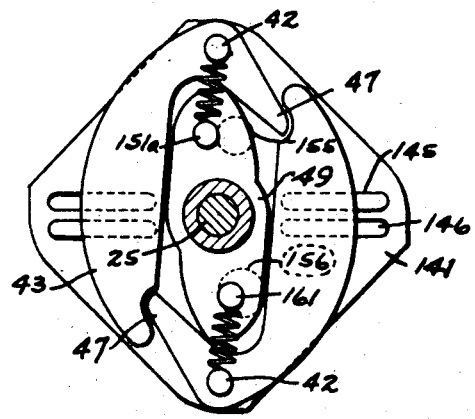
Fig. 10 is a plan similar to Fig. 8 to allow a greater advance of the rotating parts for a counterclockwise rotation.

When an engine requires 25° advance of the cam, a post 161 of the speed responsive device is made long enough to extend into the hole 156 in the plate 141 while a post 151a will not extend to the plate 141. As shown in Fig. 9, the device is assembled so that the speed responsive device will be operated in a clockwise direction, that is, as the plate 141 is rotated in a clockwise direction the weights will swing out toward the periphery of the plate 141 in a counter-clockwise direction and advance the cam substantially 25° in a clockwise direction. If it is desired to adapt the apparatus for an installation in which the cam is advanced 25° in a counterclockwise direction the plate 141, lever 49, and the weights 43 are reversed upon a horizontal line of Fig. 9, and assembled as shown in Fig. 10. In such a construction the weights will swing out toward the periphery of the plate 141 in a clockwise direction and advance the cam substantially 25° in a counterclockwise direction. It will be necessary to assemble the studs 161, 151a, and studs 42 upon the proper face of the lever arms 48 and plate 141.

Figure 1:
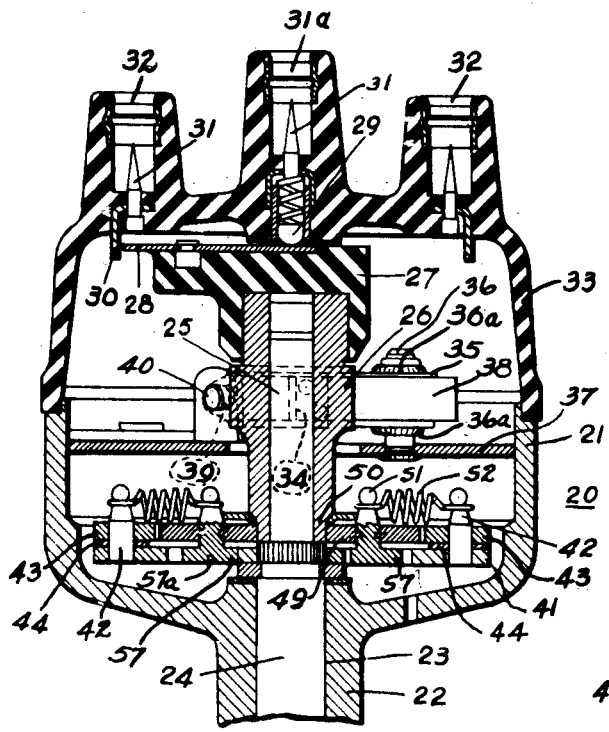
Fig. 1 is a cross-sectional view of a distributor embodying the present invention.
Figure 11:
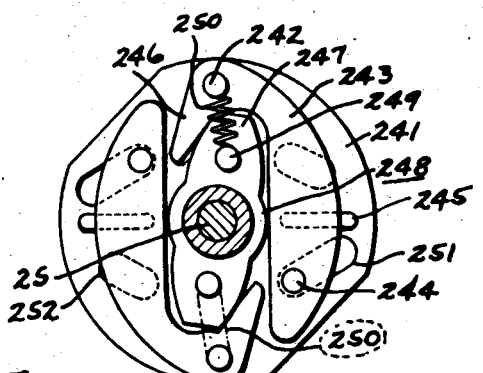
Fig. 11 is a plan view of another modified form of the speed responsive device showing an assembly of the rotating parts adapted for a clockwise rotation.
Figure 12:
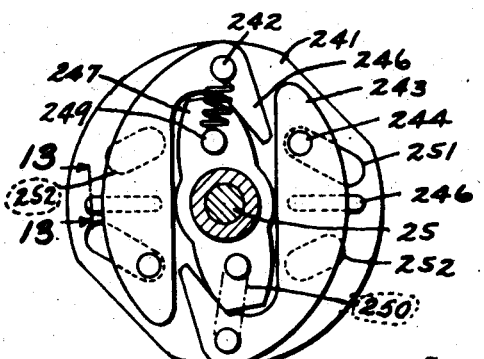
Fig. 12 is a plan view showing the parts illustrated in Fig. 11 adapted for a counterclockwise rotation.
Figure 13:
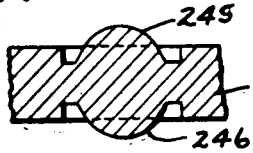
Fig. 13 is a sectional view taken on line 13—13 of Fig. 12.

Figs. 11 and 12 illustrate another modified form of a speed responsive device having a supporting plate 241 to which are attached weight studs 242, each serving as a pivot for a weight 243. These weights are provided with pins 244 or lugs extending down from the lower surface of the weight 243. Each weight is spaced from the plate 241 by a spacer about the stud 242, not shown, and rests upon a rib or ridge 245 or 246 struck from the surfaces of the plate by a suitable punch and die device. The ribs formed are illustrated in Fig. 13. These ribs tend to reduce friction which would retard the movement of the weight levers 243 about their pivot posts 242. Each weight is provided with a finger 246 which engages an arm 247 of a lever arm 248. The arm is attached to the lower end of a cam shaft which may be journalled upon the reduced upper end 25 of the driving shaft 24 illustrated in Fig. 1. Each arm 247 carries a spring post 249; each post 249 is connected by a spring 250 with an adjacent post 242. The pins or lugs 244 extend into apertures 251 in the plate 241. Obviously, centrifugal force will cause the weights 243 and pins 244 to swing toward the periphery of the plate 241 and will cause the lever arms 247 to be rotated in a clockwise direction, as shown in Fig. 11, to advance the ignition timer cam as the speed increases; the pins extending into the apertures 251 cooperate with plate 241 to provide a stop limiting the outward movement of the weights 243.

If it is desired to adapt the apparatus for an installation in which the timer shaft is revolved in a counterclockwise direction, the plate 241 is reversed and the weights are reversed upon the posts 242 upon a horizontal line of Fig. 11 and assembled as shown in Fig. 12. It is to be understood that the posts 242 are assembled upon the proper face of the plate 241. Thus, the weights are arranged for clockwise rotation outwardly upon their pivot post 242. When the speed responsive device is at rest, the pins 244 will practically touch the inner edge of the apertures 251. When the pins 244 are within the apertures shown in Figs. 11 and 12 respectively, the cam is advanced substantially 28° in clockwise and counterclockwise directions respectively.

When an engine requires substantially 12° advance of the cam for either clockwise or counterclockwise direction of rotation the pins 244 upon the weights are placed within the apertures 252 in the plate 241. Therefore, the aperture 252 serves the same purpose as the apertures 251 when the speed responsive devices are assembled for engines requiring a smaller advance movement of the cam.

Figs. 14 and 15 inclusive show another modified form of the present invention having a supporting plate 341. The plate is provided with a pair of spaced apertures 355 and 356 of different dimensions, the apertures being substantially diametrically opposite each other, each aperture determining the amount of advance of the timer cam. The plate is provided with ribs 345 and 346 struck up from their respective surfaces and serves the same purpose as the ribs 45 and 46 do when the apparatus is in operation.

In the construction shown in Figs. 14 and 16 the assembly comprising the shaft 25 and the plate 341 and the assembly comprising the lever 49 and the cam 26 can be used for both a 15° and 25° advance of the ignition timer in a clockwise rotation. For a 15° advance, (see Fig. 14) the pin 151 extends into the hole 355 in the plate 341, while the other post 160 does not extend to the plate. Obviously centrifugal force will cause weights 43 to swing out toward the periphery of the plate 341 and will cause the lever 49 to be rotated in clockwise rotation to advance the ignition timer. The lower end of the pin 151 extending into the hole 355 cooperates with the plate 341 to provide a stop limiting the movement of the weights 43.

Should a 25° advance of the ignition timer be desired, the lever 49 and cam 26 assembly is rotated 180° on the shaft 25 so that the pin 151 will extend into the aperture 356 (see Fig. 16) or the pin 160 may have an extension extending into the aperture 356 and the pin 151 will not extend to the plate 341.

If it is desired to adapt the apparatus for an installation in which the timer shaft is revolved in a counterclockwise direction the assembly of the plate 341 is turned upside down and assembled to the shaft 25 and the lever 49 is turned upside down and assembled to the cam shank portion 50 and assembled as shown in Figs. 15 and 17. It is to be understood that the posts 42 and the pins 151, 160 are assembled upon the proper surfaces of the plate 341 and the lever arms 48 respectively. It will be noted that the weights 43 are reversed upon the posts 42 as shown in Figs. 15 and 17, whereby these weights are arranged for clockwise rotation outwardly upon their weight post 42. Therefore, in such a construction when the weights 43 swing out the lever 49 will be rotated in a counterclockwise rotation relative to the shaft 25, and will advance the timer cam 26 in a counterclockwise direction as viewed in Figs. 15 and 17.

Should the apparatus be assembled for a 15° advance of the ignition timer for a counterclockwise rotation of the timer shaft 25 the pin 151 will extend into the aperture 355 as shown in Fig. 15.

If it is desired to have the apparatus assembled so that a 25° advance of the ignition timer is provided for a counterclockwise rotation of the timer, the assembly comprising the lever 49 and the cam 26 should be moved 180° so that the pin 151 will extend into the aperture 356, or the pin 160 may have a projection extending into the aperture 356 and the pin 151 will not extend into the aperture 355. In this case the lever and cam assembly need not be rotated 180°.

Figs. 18 and 19 illustrate another modified form of a speed responsive device for which the different parts or elements comprising the speed responsive device may be reversible and interchangeable so that by a slight rearrangement it may be made to operate in either a clockwise or counterclockwise direction of rotation. Thus, the form illustrated in Figs. 18 and 19 comprises a weight plate 441 adapted to be mounted with either face up upon the shaft 25. Studs 442 are provided and adapted to be mounted on either face of the plate 441, each serving as a pivot for a weight 443. The weights are provided with projections or pins 444 adapted to extend into apertures 455 provided in the plate 441. The shaft 25 forms a bearing or journal for the sleeve 50 to which is attached a lever 449 having two arms 448. Each weight 443 has a tail piece 450 which cooperates with a cam edge 451 of the arms 448. Each arm has two symmetrical cam edges and these edges permit the weights to be turned over so that the tail pieces will cooperate with the opposite sides of the arms 448. This permits the same parts to be used with either a clockwise or counterclockwise rotation.

The weights each carry a projection 444 that projects into the slots or apertures 445 and in the plate 441, the projections cooperating with the ends of the slots limit the extreme inward and outward movement of the weights. From an inspection of Fig. 18 it is obvious that as the weights move outwardly, the tail pieces cam against the cam edges of the arms 448 of the lever 449 and advance the lever and timer cam angularly in a clockwise direction of rotation with respect to the shaft 25.

If it is desired to have the apparatus for an installation in which the timer shaft is revolved in a counterclockwise direction, the plate is reversed and assembled upon the shaft 25 as shown in Fig. 19. The weights 443 are also reversed upon their posts, whereby these weights are arranged for clockwise rotation outwardly upon their posts. Therefore in such a construction when the weights swing out, the arms 448 will be rotated in a counterclockwise rotation relative to the shaft 25, and will advance the timer cam in a counterclockwise rotation.

While the form of embodiment of the present invention as herein disclosed, constitutes a preferred form, it is to be understood that other forms might be adopted, all coming within the scope of the claims which follow.

What is claimed is as follows:

1. A speed responsive device comprising in combination; a drive shaft; a driven shaft; a plate having spaced apertures of different dimensions arranged in a non-diametrical relation with respect to each other, said plate adapted to be attached to said drive shaft with either face up dependent on the direction of rotation of said drive shaft; a lever arm adapted to be mounted with either face upon said driven shaft; a pivot post adapted to be carried on either face of said plate; a weight member having a finger, said weight adapted to be rotatably supported on said post with either face adjacent said plate whereby said finger may engage an edge of said arm to angularly adjust said driven shaft from a normal position; and means extending into either of said apertures in said plate and cooperating with said plate to limit the angular movement of said driven shaft in either direction from normal position with respect to said drive shaft.

2. A speed responsive device comprising in combination; a drive shaft; a driven shaft; a plate member carried by said drive shaft and having non-diametrical spaced apertures; a weight member pivotally carried by said plate, an arm member carried by said driven shaft; a stop member carried by said arm member and extending into and cooperating with one of said apertures of said plate to determine the limit of angular movement of said driven shaft with respect to said drive shaft in one direction from normal position; and each of said members capable of being reversed upon their respective carrying means to determine the limit of angular movement of said driven shaft with respect to said drive shaft in the opposite direction from normal position.

3. A speed responsive device, comprising in combination; a drive member; a driven member; and adjustable eccentric means carried by and positioned in predetermined association with said driven member, said eccentric means cooperating with means on said drive member to determine an angular relation of said driven member relative to said drive member.

4. A speed responsive device, comprising in combination, a drive member, a driven member, and a plurality of adjustable eccentric means carried by said driven member cooperating with said drive member controlling the movement of advance of said driven member relative to said drive member, one of said means determining the initial advance movement and another of said means determining the limit of advance movement between said members.

5. A speed responsive device comprising in combination a drive shaft; a driven shaft; a plate member having apertures attached to said drive shaft; weight members pivoted on said plate; a lever member carrying adjustable eccentric members, said eccentric members extending into said apertures of said plate and each of said eccentric members is constructed so that each member can be positioned with respect to each other to provide for a different operable condition for purposes set forth.

6. In a device of the character described, the combination comprising, a drive shaft; a driven member rotatably supported upon said drive shaft; a supporting plate having spaced apertures of different dimensions mounted upon said shaft; a lever arm secured to said driven member; a stud member carried by said lever arm and extending into one of said apertures, said stud cooperating with the said aperture to provide for an angular movement of said driven member relative to said drive shaft for one direction of rotation of the drive shaft; means for actuating said lever arm to provide said angular movement; and said supporting plate, lever arm including said stud member, and actuating means thereof are reversible, whereby the same set of parts function for another direction of rotation of said drive shaft.

7. In a device of the character described, the combination comprising; a drive shaft; a driven member; a supporting plate secured to said drive shaft, said plate having a plurality of non-diametrically spaced apertures of different dimensions; a lever arm connected to said driven member; a stud carried by said lever arm, said stud extending into one of said apertures to control a predetermined angular relation of said driven member relative to said drive shaft in one direction of rotation; and said parts of said speed responsive device adapted to be reversed upon their respective parts to control a predetermined angular relation of said driven member relative to said drive shaft in another direction of rotation.

8. In a device of the character described, the combination comprising; a drive shaft; a driven shaft; speed responsive means for angularly adjusting the relation of said shafts, said means comprising a weight support having spaced apertures of different dimensions, each aperture providing for different angular relation between the shafts; a pivot post carried by said support; a weight member pivotally mounted on said post; a lever arm secured to said driven shaft and cooperating with said weight members; a stud secured to said arm and extending into one of said apertures to regulate an angular movement of said driven shaft relative to said drive shaft; said speed responsive means having parts so constructed that the same parts may be reversed to provide speed responsive means that will operate for either direction of rotation of said drive shaft.

9. A speed control means comprising, reversible members which include, in combination; a drive plate having a plurality of circumferentially spaced perforations therethrough; weight members pivoted upon said plate; a driven member; a lever connected to said driven member and having arms cooperating with said weight members; and adjustable means carried by one of said arms and projecting into one of said perforations to determine the limit of movement of said lever member relative to said drive plate.

10. A speed responsive mechanism comprising in combination, a drive plate having a plurality of circumferentially spaced perforations of different dimensions therethrough; weight members pivotally mounted upon said plate; a lever having arms cooperating with said weights to advance said lever; and adjustable eccentric means associated with said lever extending within one of said perforations to vary the angular relation of said lever relative to said drive plate.

11. A speed responsive mechanism comprising in combination; a drive plate having a plurality of circumferentially spaced perforations therethrough; weight members pivotally mounted upon said plate; a lever having arms, said arms cooperating with said weights to advance said lever member; and adjustable eccentric means associated with said arms on said lever cooperating with said perforations to form limits for each extreme movement of relative angular shift of the lever with respect to said drive plate.

12. A speed responsive mechanism comprising in combination; a driven shaft; a drive shaft, said shaft rotatably supporting said driven shaft; a weight plate attached to said drive shaft, said plate having spaced apertures therein; fly weights having fingers pivotally supported on said plate; a lever having arms supported by said driven shaft, said arms having edges adjacent said fingers, said fingers operable on said edges to angularly adjust said driven shaft with respect to said drive shaft from a normal position; and eccentric means secured to said arms, provisions for attaching said eccentric means to said arms into infinite positions relative to said arms, said eccentric means extending into and cooperating with said apertures to control the limit of angular relation of said shafts, and said parts of said speed responsive means being constructed so that said parts may be reversible and interchangeable to function for either direction of rotation of said drive shaft.

13. In a speed responsive device, the combination comprising a drive shaft; a driven shaft; eccentric means; provision for attaching said eccentrics to the driven member into infinite positions relative to the driven member; means for connecting the drive member with the driven member for angularly adjusting the driven member from a normal position with respect to the drive member in response to increase in speed; springs for returning said driven member to normal position; and a member connected to the drive shaft and provided with spaced apertures each for receiving one of said eccentric means in one of its positions of attachment to said driven shaft, said apertures being larger than said eccentrics and so arranged that when one of said eccentrics is in one of its positions of attachment to the driven member and extends into one of said apertures, said eccentric cooperates with the apertured member to provide a stop limiting the movement of the driven member in one direction from normal; and when another eccentric is in another position of attachment to said driven shaft and extends into another aperture, said eccentric cooperates with the aperture to provide a stop limiting the movement of said driven member in another direction from normal with respect to said drive shaft.

14. A speed responsive device comprising in combination, a drive shaft; a weight support member carried by said shaft, said member having a plurality of circumferentially spaced perforations of different dimensions therethrough, and said member adapted to be attached in various relations to said drive shaft with either face up dependent on the direction of rotation of said drive shaft; a plurality of centrifugal weights having camming portions and adapted to be mounted with either side up upon studs carried by said member; a driven shaft; a spider having camming arms adapted to be mounted with either side up upon said driven shaft, said driven shaft mounted on said drive shaft for angular displacement relatively thereto, said arms of said spider and camming portions of said weights being arranged so that the weights will move outwardly from said spider; coil springs connecting said arms with said studs to exert a restraining force upon the advancing movement of the advancing spider; and adjustable means carried by said spider extending into one of said perforations of said support to determine the limit of angular movement of said driven shaft with respect to said drive shaft.

15. In a device of the character described, the combination comprising; a drive shaft; a driven shaft journaled upon the drive shaft; a plate member having spaced apertures of different dimensions; an arm member carried by said driven shaft; a stud member supported by said arm member and adapted to extend into one of the apertures of the plate member to determine an angular movement of the driven shaft with respect to the drive shaft from normal position, and said stud member adapted to extend into another aperture of the plate member to determine another angular movement of the driven shaft with respect to the drive shaft from normal position; and each of said members capable of being reversed upon their respective carrying means to regulate the angular movements of said shafts with respect to each other in an opposite direction from normal positions.

16. A speed responsive device comprising in combination; a driving member and a driven member arranged to rotate together but relatively movable; weight members pivotally supported on the driving member; a camming connection interposed between the weight members and the driven member for causing relative movement of the driving and driven members when the weights move outwardly; means associated with said driven member having provision for attaching same into infinite positions relative to said driven member and said means cooperating with said drive member controlling the limit of angular relation of said members; and spring means arranged to resist movement of the weight members.

JOHN T. FITZSIMMONS,
*Administrator of the Estate of Charles H. Davis, Jr., Deceased.*